June 10, 1958 F. E. SULLIVAN 2,838,481
METHOD FOR CONTINUOUS PROCESSING OF TALL OIL AND THE LIKE
Filed June 29, 1956
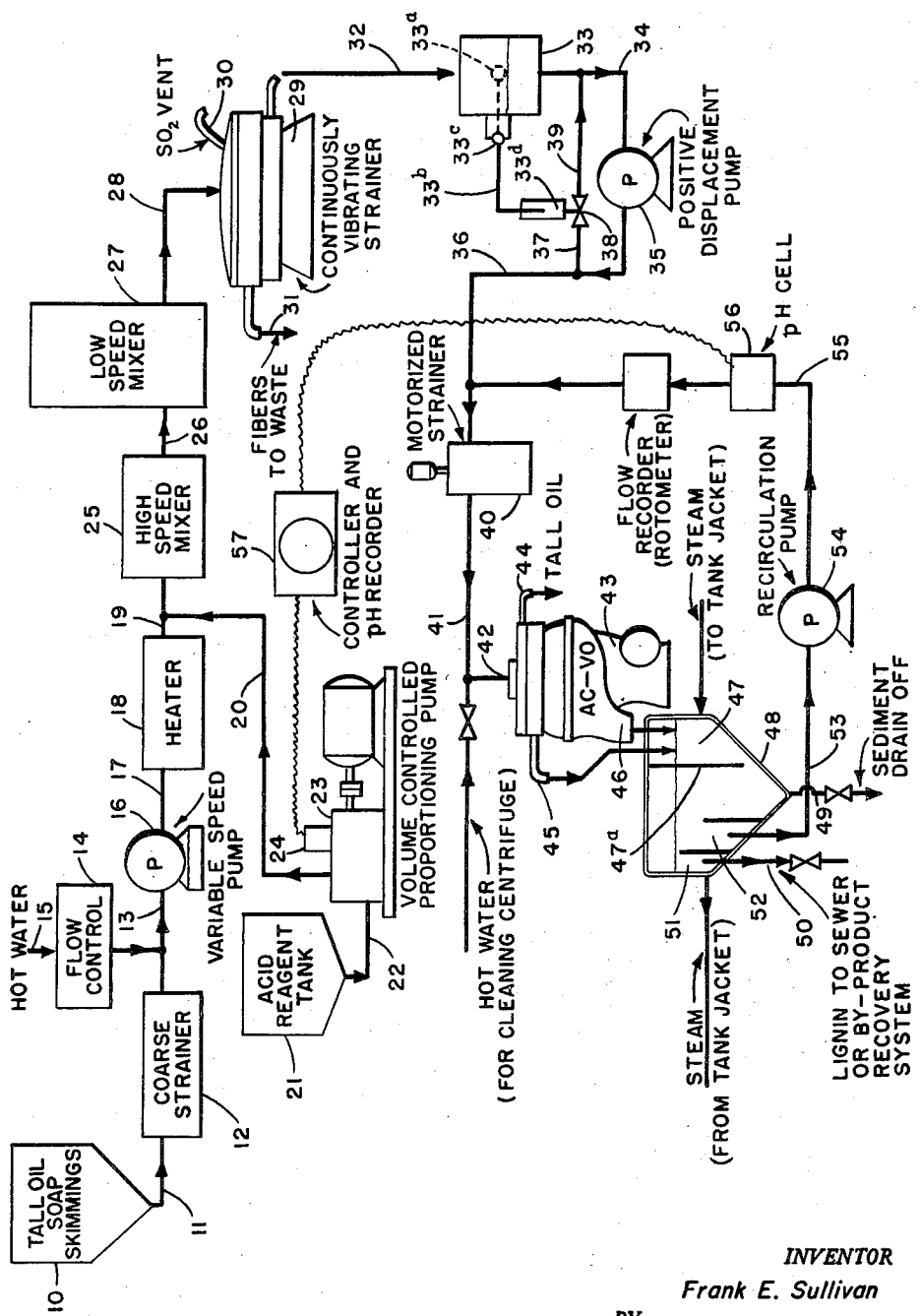
INVENTOR
Frank E. Sullivan
BY
ATTORNEYS

United States Patent Office 2,838,481
Patented June 10, 1958

2,838,481

METHOD FOR CONTINUOUS PROCESSING OF TALL OIL AND THE LIKE

Frank E. Sullivan, Poughkeepsie, N. Y., assignor to The De Laval Separator Company, Poughkeepsie, N. Y., a corporation of New Jersey Application June 29, 1956, Serial No. 594,969

9 Claims. (Cl. 260—97.5)

This invention relates to an improved method for treating soaps with an acid, such as sulfuric acid, to recover hydrolyzed products therefrom.

Although the invention is not limited to the treatment of tall oil soap, it may be used to particular advantage for this purpose, the recovered product in this case (tall oil) including substantial proportions of free fatty acids and rosin acids. Accordingly, for illustrative purposes the invention will be described in connection with the treatment of tall oil soap skimmings.

Tall oil skimmings are the settled soap from concentrated black liquor as produced by typical kraft paper mills. The soap which is settled from the concentrated black liquor, usually in gravity settling tanks, consists mainly of rosin and fatty acid soaps. The settled soap, commonly termed tall oil skimmings, averages between about 45% and 55% tall oil, the rest consisting primarily of sodium salts and lignins.

According to the present invention, the tall oil skimmings are diluted with water to reduce the viscosity of the skimmings and facilitate the subsequent reaction with an acid. This dilute soap solution is then reacted with a strong acid, such as sulfuric acid, to acidulate the soap solution. The reaction between the soap solution and the acid in an exothermic reaction which liberates substantial quantities of noxious gases such as sulfur dioxide, hydrogen sulfide, etc. The acidulated soap solution or reaction mixture is then subjected to centrifugal separation to separate acid water from the tall oil.

I have found that the processing of tall oil skimmings in this manner can be greatly improved by removing the noxious gases, such as $SO_2$, $H_2S$, etc., from the acidulated soap solution prior to the centrifugal separation of this solution. In the preferred practice of the invention, these gases are removed from the other products of reaction between the soap solution and acid, by flashing the gases into an open chamber. In one embodiment of the invention, this chamber forms part of a continuous vibrating strainer and is vented to atmosphere to draw off the noxious gases, whereby the acidulated soap solution is subjected to vibration and straining incident to removal of the gases.

In the centrifugal separation of the acidulated soap solution, the latter is separated into tall oil and acid water, as previously mentioned. The acid water, which is the relatively heavy phase, contains spent acid, salts, lignins and other foreign material. According to another feature of the invention, this acid water is returned to the acidulated soap solution on its way to the centrifugal separating operation, preferably after passing the acid water through a separating zone to remove lignins and solids as relatively light and heavy components, respectively, from the acid water. In this way, the acid water separated from the tall oil or fatty acids is re-used in the process to supplement the fresh acid which is mixed with the dilute soap solution. I prefer to return this separated acid water to the acidulated soap solution at a point between the gas-removal zone or vented vibrating strainer and the locus of centrifugal force where the separation of acid water from tall oil is effected. With this arrangement, overloading of the gas-removal zone is avoided, the recirculated acid water being free from noxious gases.

For a better understanding of the invention, reference may be had to the accompanying drawing in which the single illustration is a schematic view of a preferred form of a system for use in practicing the invention.

Referring to the drawing, the tall oil soap skimmings to be treated are delivered to a supply tank 10 and flow from the bottom of this tank through a pipe 11 to a coarse strainer 12. From the strainer 12, the skimmings flow through a pipe 13 where they are mixed with a stream of hot water fed through a flow control device 14 in a pipe 15, the latter pipe leading into the pipe 13. The combined streams of tall oil soap skimmings and water flow through a variable speed feed pump 16 and pipe 17 to a heater 18, where the dilute soap solution is heated to a temperature of about 150° F. to 180° F. The amount of water added to the skimmings through pipe 15 may vary within large limits, generally between 25–200 parts of water to 100 parts of tall oil present in the skimmings.

From the heater 18, the dilute soap solution passes through a pipe 19 where it is mixed with an acid reagent, such as sulfuric acid, from an acid supply tank 21. The acid from tank 21 flows through a pipe 22 to a volume-controlled proportioning pump 23 having a control valve 24 which governs the rate at which the acid is delivered from the pump into a pipe 20 which joins the pipe 19.

The mixture of dilute soap solution and acid flows from pipe 19 through a high speed mixer 25, a pipe 26 and a low speed mixer 27. The mixer 25 serves primarily to disperse the acid intimately and rapidly throughout the dilute soap solution, while the mixer 27 serves primarily to maintain the reaction products in intimate mixture over a more sustained period of contact. From the mixer 27, the mixture flows through a pipe 28 to a continuously vibrating strainer 29, the chamber of which is vented to atmosphere as shown at 30. The vibrating strainer 29 serves to separate cellulose fibers from the mixture so that such fibers will not clog the centrifugal separator to which the mixture is subsequently fed, as will be described in greater detail hereinafter. These fibers are discharged from the strainer 29 through outlet 31. The noxious gases resulting from the reaction between the acid and the soap solution are flashed into the chamber within the strainer 29 and escape through the vent 30, it being understood that this chamber is at a substantially lower pressure than that existing in the pipe-line 28 leading to this chamber.

The acidulated soap solution is discharged from the gas removal zone and strainer 29 into a pipe 32 which leads to a seal tank 33. From the bottom of this tank, the solution flows through a pipe 34, a positive displacement feed pump 35, a pipe 36, a motorized fine mesh strainer 40, and pipes 41 and 42 to a centrifugal separator 43.

In order to maintain a steady flow rate of acidulated soap solution to the centrifuge 43 equivalent to the flow rate at the junction of pipes 19 and 20, a return by-pass 37—38—39 is provided between the output and input sides of the pump 35. The rate of by-passed flow is controlled by a float 33a located in the sealed tank 33 and operatively connected to the by-pass valve 38. As shown, this operative connection comprises a lever 33b mounted intermediate its ends on a pivot 33c in a wall of the sealed tank, one end of this lever supporting the float 33a and the other end being connected through an adjacent link 33d to the valve 38. Thus, upward or downward movement of the float 33a results in cutting down or increasing the flow rate, respectively, through by-pass valve 38. By means of the adjustable link 33d, the valve 38 may be adjusted for any desired flow rate at a given level of the liquid in tank 33.

It will be understood that the connection between float 33a and by-pass valve 38 may take other forms than that described above. For example, the tank 33 may be provided with a "Moore" liquid level float-operated control which governs the flow of compressed air to a "Foxboro" air-operated diaphragm valve which, in turn, operates the by-pass valve 38.

The valve 38 functions to permit recirculation of only the excess flow rate discharged by pump 35 to pipe 36 over the flow rate at the juncture of pipes 19 and 20. If it should be desired to have a feed rate to the centrifuge 43 of twenty gallons per minute, the flow rate of pump 35 can be set at twenty-five gallons per minute and the link 33d adjusted so that valve 38 is held open sufficiently to return five gallons per minute from pipe 36 to pipe 34 by way of pipes 37–39. Also, the flow rate on the juncture of pipes 19 and 20 (which is proportional to the flow rate through pipe 32) is adjusted to twenty gallons per minute. Under these conditions, the additional five gallons per minute of the pre-set capacity of pump 35 is continuously by-passed to the pump inlet by way of the by-pass line 37—38—39, and the flow rate of the solution of acidulated tall oil skimmings to centrifuge 43 is maintained at twenty gallons per minute. If the flow rate in the system increases to say twenty-three gallons per minute at the juncture of pipes 19 and 20, then the flow rate through pipe 32 will correspondingly increase and cause float 33a to rise as a result of an increased level of liquid in tank 33. The rising float 33a operates through its connection 33b–33d to move valve 38 toward its closed position, thereby reducing the rate of by-pass flow through this valve, this by-pasn rate in the assumed example being reduced to two gallons per minute, thus the pump 35 will now deliver twenty-three gallons per minute to the centrifuge 43, the remaining two gallons per minute from the pump 35 being by-passed through line 37—38—39.

If the flow rate of pipe 32 should decrease to say seventeen gallons per minute, the the float 33a is lowered by the decreasing level of liquid in tank 33. The descending float operates through its connection 33b–33d to actuate valve 38 toward its fully open position and thereby increase the by-pass flow rate to eight gallons per minute. The remaining seventeen gallons per minute from pump 35 is, of course, delivered to the centrifuge 43.

The sealed tank 33 provides an air-free inlet to pump 35, whereby undue surges of flow in pipe 36 are prevented.

Within the centrifuge 43, the feed stream from pipe 42 is separated into two and possibly three components. As illustrated, the centrifuge has outlets 44, 45 and 46 for three separate components. The refined tall oil, which is the lightest component is discharged through outlet 44; acid water interphase and lignin are discharged from the heavy lignin phase outlet 45; and acid water and lignin together with some sediment are discharged through the nozzle outlet 46. Both the nozzle discharge and the heavy lignin phase (if any) are fed to a baffled chamber 47 of a recirculation tank 48.

The tank 48 is preferably heated to 180–200° F., as by means of steam admitted to jacketed walls of the tank. The chamber 47 is partly divided by a baffle 47a which forms an outlet at the bottom of this chamber, so that a common liquid level is maintained in chamber 47 and in the main portion of tank 48. The solids or sediment slide down the inclined base of tank 48 and can be drawn off from time to time through a valved pipe 49 leading from the lowest point of the tank. Two other outlets are provided from the tank base. One of these outlets, shown at 50, leads from a baffled chamber 51 which is closed at the bottom from the remainder of the tank and extends almost to the liquid level in the tank. Some acid water interphase and almost all of the free lignins will flow off the top of the baffle forming chamber 51 nad are drawn off from chamber 51 through outlet 50 as waste or as feed material for a by-product recovery system. Another baffled chamber 52 is likewise located in tank 48 and is closed at the bottom from the remainder of the tank. This chamber 52 extends upward about half-way to the liquid level in the tank, and a recirculation pipe 53 leads from the bottom of chamber 52. From the baffled chamber 52, practically all of the acid water and any entrained lignins are returned to the centrifuge by way of pipe 53, a recirculation pump 54, and pipe 55, which joins the pipe 36.

The volume control for the proportioning pump 23 will now be described in greater detail. If the pH value of the acid water and lignins recirculated by pump 54 should rise above about 4.5, then the reaction at the conclusion of the mixing in mixers 25 and 27 is not complete. In other words, if the material recirculated by pump 54 should acquire a pH value greater than about 4.5, this means that more acid should have been added through pipe 20 to the skimmings in pipe 19. A pH cell 56 is inserted in pipe 55 to determine continuously the pH value at that point. The cell 56 is electrically connected to a pH recorder and controller 57 which, in turn, operates the acid reagent control valve 24 covering the rate at which the acid is delivered by pump 23 through pipe 20. Thus, if the recirculation material flowing through pipe 55 acquires a pH value above about 4.5, then the cell 56 operates through a controller 57 and control valve 24 to increase the rate at which the acid is introduced into pipe 19; and if this pH value becomes substantially less than about 4.5, the control valve 24 is operated from cell 56 and controller 57 to reduce the feed rate of acid into pipe 19.

The heater 18 preferably heats the diluted tall oil skimmings to a temperature of about 150–180° F. The reaction between sulfuric acid and the soap is exothermic, so that the mixture will increase in temperature by about 10°–15° F. In some cases, it may be desirable to heat the mixture further after the acid reaction and prior to centrifugal separation in the centrifuge 43. Generally, the most satisfactory temperature to separate this mixture in the centrifuge 43 is between 180° and 200° F.

Approximately 95% to 98% of the lignins present in the tall oil skimmings is removed from the tall oil by the practice of the present method, and the yield of tall oil from the soap is in the range of about 95% to 99%.

The refined tall oil discharging from outlet 44 of the centrifuge, may be passed through a water washing stage or a vacuum drying stage, or both, depending upon the purity desired in the final product.

*Example 1*

A batch of tall oil skimmings was processed according to the present invention. The skimmings as received analyzed as follows: Tall oil yield 57.3%, water 38.2%, ash 7.5% and lignin 1.9%. On a 100% tall oil basis, the tall oil yield sample analyzed 50.5% rosin acids, 43.6% fatty acids, and 5.9% unsaponifiable.

To 100 parts of skimmings were continuously added 100 parts of water. This mixture was heated to 155–160° F. Sulfuric acid of 66° Bé. was continuously added at the rate of 17 parts acid to 100 parts of tall oil present in the skimmings. This mixture was passed through a high speed mixer to aid the reaction. The temperature out of the mixer was 170–175° F. due to the exothermic reaction. This mixture was then passed through a heater and heated to 182° F. to 190° F. prior to separation.

Prior to entering the centrifugal separator the gases from the reaction were continuously bled-off. The tall oil produced analyzed 1.3% water, 0.1% lignin, 49.5% rosin acids, 42.3% fatty acids and 6.8% unsaponifiables.

Example 2

A batch of tall oil skimmings was treated with 66° Bé. sulfuric acid in a continuous acidulation run. The tall oil skimmings or soap as received was heated in tank 10 to 120° F. The crude soap was then pumped through the process. Through pipe 15 was continuously added a proportioned amount of hot water in an amount equal to 50% by weight of tall oil present in the skimmings. This mixture was heated to 170° F. in heater 18. Through pipe 20 a proportioned amount of 66° Bé. sulfuric acid was added, this amount being 21% by weight based on the tall oil in the skimmings. This acid mixture then went through mixer 25–27 and to another heater (not shown) where the temperature was raised to 200° F. From this heater, the mixture flowed through the vent tank 29 where the gases from the reaction ($SO_2$, $H_2S$, etc.) were liberated. The mixture was picked up by pump 35 and fed to the centrifugal separator 43. The light phase product was purified tall oil, while the acid water was discharged as the heavy phase. Most of the lignin was present in the acid discharge.

The pH of the acid water was 0.7. The lignin removal from the tall oil was 97% efficient, as the purified tall oil contained only 0.16% lignin after separation. The purified tall oil analyzed 0.16% lignin and 1.8% total water. However, the tall oil contained black specks indicating charring due to the use of concentrated 66° Bé. sulfuric acid.

Example 3

A batch of tall oil skimmings was processed in a similar manner to that in Example 2 except that 60° Bé. sulfuric acid was used instead of 66° Bé. The skimmings were diluted continuously with 88 parts of water per 100 parts of tall oil present in the skimmings. This mixture was heated to 170° F., and 21 parts of 60° Bé. sulfuric acid per 100 parts of tall oil were added. The resulting exothermic reaction caused the temperature of the mixture to raise about 15° F. or to 185° F. The reaction mixture was then passed through a heater and raised to 200° F. prior to separation. Separation took place continuously in a centrifuge. The tall oil from the centrifuge contained less than 0.1% lignin, and 54 parts per million of mineral acid. The fatty acid to rosin acid ratio remained the same as in the original skimmings when the analyses of the skimmings were calculated on the basis of tall oil yield. The yield of tall oil averaged 98.2%. The use of 60° Bé. sulfuric acid eliminated the slight charring noticed in Example 2.

The analysis of the tall oil soap or skimmings as received from a Southern Kraft Paper Mill and used in Examples 2 and 3 is as follows:

|  | Percent |  |
|---|---|---|
| Tall oil yield | 56.6 | |
| Moisture | 38.8 | |
| Lignin | 1.45 | |
| Ash | 6.8 | |
| Rosin acid | 47.4 | Based on 100% tall oil |
| Fatty acid | 46.3 | |
| Unsaponifiable | 6.3 | |

The average analyses of the tall oil produced from the above skimmings by the continuous acidulation process heretofore described is as follows:

| | | |
|---|---|---|
| Moisture (xylene method) | percent | 1.2 |
| Lignin | do | 0.08 |
| Fatty acid | do | 42.6 |
| Rosin acid | do | 46.3 |
| Unsaponifiable | do | 6.6 |
| Acid number | | 172 |
| Rosin acid number | | 86.6 |
| Oxidized acids | percent | 1.1 |
| Mineral acids | do | 0.005 |

In the preferred form of the system shown in the drawing, the centrifuge 43 provides a three-way discharge of the separated components through outlets 44, 45 and 46 which respectively discharge (1) the refined tall oil or light phase, (2) an interphase of acid water and lignin, and (3) a heavy phase which is a mixture of acid water, lignin and sediment, as previously described. The reason for my preference for this three-way discharge is that if the two heavier phases, (2) and (3) above, are discharged through a common outlet, the combination of the lignins and sediment (including the salts previously mentioned) acts to create blockage of the discharge, so that the centrifuge does not operate consistently over long periods to effect the desired clean separation of the refined tall oil without plugging of the centrifugal bowl.

The centrifuge 43, as illustrated, has outlets 44, 45 and 46 which are not sealed from atmosphere but discharge directly into atmosphere, which is characteristic of an open bowl type of centrifuge as distinguished from a so-called hermetic centrifuge operating with its bowl completely filled with liquid. The open bowl centrifuge inherently allows gases in the feed to escape into the air space in the central part of the separating chamber in the bowl, from whence they can discharge with the separated lighter component. Also, in cases where the open bowl is vented to atmosphere around the feed tube, the more readily released gases in the feed can escape through this vent. However, unless the acidulated tall oil soap solution is passed through a de-gasing zone (as at 29) before feeding it through even an open bowl centrifuge, the centrifuging operation will be impaired and impracticable due to the quantity of the reaction gases entering the centrifuge, as these gases can escape only with the separated tall oil and in some cases back through the vent around the feed tube. That is, the gases accompanying the tall oil act to block off the tall oil discharge and create unstable back pressures, and the gases discharging back through the feed vent act to vary the feed rate to the separating chamber, whereas continuous operation of the centrifuge to effect a clean separation of the tall oil requires stable conditions in the bowl.

Thus, regardless of whether the centrifuge 43 is of the open bowl or full bowl type, the advantages of the present invention can be realized only by subjecting the acidulated tall oil soap solution to a de-gasing operation, as at 29, before feeding it to the cetrifuge. By flashing the gases in the open or vented chamber of the de-gasing zone 29, substantially all of the reaction gases are removed before they can interfere with the centrifuging operation.

I claim:

1. The method of treating tall oil skimmings to recover hydrolized products, which comprises mixing the skimmings with water and acid to form a dilute soap solution in which the acid is intimately dispersed, whereby the acid and solution undergo an exothermic reaction producting a reaction mixture of tall oil, spent acid water, lignin, salts and reaction gases, subjecting said reaction mixture to a gas-removal step to substantially de-gas the mixture, feeding the de-gassed reaction mixture to a locus of centrifugal force and there separating it into tall oil as a light phase, acid water and salts as a heavy phase, and acid water and lignin as an interphase, separately discharging the three phases from said locus, feeding the discharged interphase and heavy phase to a separating zone and there separating lignin and salts as relatively light and heavy components, respectively, from said acid water, and returning acid water from said separating zone to the reaction mixture.

2. The method according to claim 1, in which said acid water from the separating zone is returned to the de-gassed reaction mixture.

3. The method according to claim 1, in which said gas-removal step includes flashing the reaction gases in an open chamber.

4. The method of treating tall oil skimmings to recover hydrolized products, which comprises mixing the skimmings with water to form a dilute soap solution, continuously feeding a stream of acid into a stream of the soap solution and mixing said acid and solution to acidulate the solution, whereby the acid and solution undergo an exothermic reaction which creates noxious gases, flowing the acidulated solution through a gas-removal zone and there substantially removing said gases from the solution, and feeding the solution from said last zone to and through a locus of centrifugal force to separate the solution into hydrolized products and acid water as separate components.

5. The method according to claim 4, comprising also the step of returning said acid water component to the acidulated solution.

6. The method according to claim 4, comprising also the step of returning said acid water component to the acidulated solution from which the gases have been substantially removed in said gas-removal zone.

7. The method according to claim 4, in which said acid water component includes lignin and relatively heavy solids, the method comprising also the step of passing said acid water component through a separating zone to separate lignin and solids as relatively light and heavy components, respectively, from the acid water, and returning said acid water to the acidulated solution.

8. The method according to claim 4, in which said acid water component includes lignin and relatively heavy solids, the method comprising also the step of passing said acid water component through a separating zone to separate lignin and solids as relatively light and heavy components, respectively, from the acid water, and returning said acid water to the acidulated solution from which the gases have been substantially removed in said gas-removal zone.

9. The method according to claim 4, comprising also the steps of vibrating and straining the acidulated solution during flow thereof through said gas-removal zone.

References Cited in the file of this patent

UNITED STATES PATENTS

| | | |
|---|---|---|
| 2,143,345 | Frankel et al. | Jan. 10, 1939 |
| 2,200,468 | Cirves | May 14, 1940 |
| 2,294,446 | Brown et al. | Sept. 1, 1942 |
| 2,475,361 | Thurman | July 5, 1949 |

OTHER REFERENCES

Chem. Engrs. Handbook, 3rd ed. (1950), page 1216.